(12) United States Patent
Huang et al.

(10) Patent No.: US 7,436,158 B2
(45) Date of Patent: Oct. 14, 2008

(54) LOW-GAIN CURRENT-MODE VOLTAGE REGULATOR

(75) Inventors: Jian-Rong Huang, Hsinchu (TW); Kuo-Lung Tseng, Lungtan Township, Taoyuan County (TW); Giuseppe Bernacchia, Padua (IT); Maurizio Inversi, Padua (IT)

(73) Assignee: Richtek Technology Corp., Hsinchu (TW)

( * ) Notice: Subject to any disclaimer, the term of this patent is extended or adjusted under 35 U.S.C. 154(b) by 263 days.

(21) Appl. No.: 11/493,550

(22) Filed: Jul. 27, 2006

(65) Prior Publication Data

US 2008/0024100 A1    Jan. 31, 2008

(51) Int. Cl.
*G05F 1/613*    (2006.01)
*G05F 1/00*    (2006.01)

(52) U.S. Cl. .................. 323/224; 323/283; 323/285
(58) Field of Classification Search .............. 323/224, 323/283, 284, 285
See application file for complete search history.

(56) References Cited

U.S. PATENT DOCUMENTS 6,057,675 A * 5/2000 Tateishi ................... 323/283

* cited by examiner

*Primary Examiner*—Shawn Riley
(74) *Attorney, Agent, or Firm*—Rosenberg, Klein & Lee

(57) ABSTRACT

In a low-gain current-mode voltage regulator having a PWM comparator in response to the varying output voltage and inductor current of the voltage regulator to produce a PWM signal to regulate the output voltage, an offset signal is derived from a subtraction between the inputs of the PWM comparator, and the offset signal is injected into the PWM comparator to cancel the output offset of the voltage regulator.

8 Claims, 8 Drawing Sheets

LOW-GAIN CURRENT-MODE VOLTAGE REGULATOR

FIELD OF THE INVENTION

The present invention is related generally to a voltage regulator and, more particularly, to a low-gain current-mode voltage regulator.

BACKGROUND OF THE INVENTION

Voltage regulators have been widely used in various electronic devices to implement the power supplies for providing stable supply voltages for the circuits in the electronic devices. However, spike will be generated on the output voltage of the voltage regulator in load transient resulted from instant load change, and large voltage spike may damage the load connected to the voltage regulator. FIG. 1 is a waveform diagram to show the output signals of a conventional voltage regulator in a load transient, in which waveform 100 represents the load current ILoad and waveform 102 represents the output voltage Vout. At time t1, in response to the load changing from light to heavy, the load current ILoad steps up, and the output voltage Vout drops down from the nominal voltage by a difference $\Delta V$ and then gradually recovers to the original level. At time t2, the load changes from heavy back to light and therefore, the load current ILoad steps down, and the output voltage Vout jumps up from the nominal voltage by the difference $\Delta V$ and then recovers back to the original level. As shown in FIG. 1, the output voltage Vout has a spike having the amplitude $2\Delta V$ due to the load transient. To avoid the voltage spike so large to damage the load, conventionally several parallel-connected capacitors are used at the output of a voltage regulator to reduce the voltage spike. However, increasing the size of the output capacitor will increase the volume, weight and cost of the voltage regulator. It is therefore a stringent challenge on the voltage regulator module (VRM) for real applications. To alleviate this problem, Intel has proposed an adaptive voltage position (AVP) control, which uses a voltage droop control in a voltage regulator to reduce the voltage spike on the output voltage of the voltage regulator. FIG. 2 is a waveform diagram to show the output signals when the AVP control is applied in a voltage regulator, in which waveform 104 represents the load current ILoad and waveform 106 represents the output voltage Vout. When the load changes from light to heavy at time t1, the load current ILoad steps up and the output voltage Vout drops down by a difference $\Delta V$, as in the conventional one 102. However, under the AVP control, the output voltage Vout is maintained at the lower level once it drops down, and until the load changes from heavy back to light, the output voltage Vout recovers from the low level back to the nominal voltage. As shown in FIG. 2, the spike of the output voltage Vout due to the same load transient is much smaller than $2\Delta V$ of the conventional one 102, and thus the AVP control significantly reduces the voltage spike resulted from the load transient.

Intel's road map shows that the VRM for central processing unit (CPU) needs very tight regulation. Currently, active droop control is a popular way to achieve the AVP of a VRM, and an implementation is based on a low-gain peak current-mode topology. FIG. 3 shows a current-mode voltage regulator 110, which comprises an error amplifier 112 having a gain Av to amplify the difference between the output voltage Vout of the voltage regulator 110 and a reference voltage Vref to produce an error signal COMP connected to the inverting input of a pulse-width modulation (PWM) comparator 114, and a voltage amplifier 116 having a gain Ai to detect the inductor current IL flowing through an inductor L to produce a current sense signal VCS connected to the non-inverting input of the PWM comparator 114 for the PWM comparator 114 to compare with the error signal COMP to determine a PWM signal connected to the reset input R of an SR flip-flop 118 that has its set input S connected with a constant-frequency clock CLK. Upon the clock CLK transiting from low level to high level, the SR flip-flop 118 is triggered to set its output Q for a high-side switching signal U to be high level and complementary output /Q for a low-side switching signal L to be low level, and upon the PWM signal transiting from low level to high level, which is when the current sense signal VCS is crossing with the error signal COMP, the SR flip-flop 118 is reset to transit the high-side switching signal U from high level to low level and the low-side switching signal L from low level to high level. The switching signals U and L switch a high-side transistor 124 and a low-side transistor 126 with two driver 120 and 122, respectively, to produce the inductor current IL to charge an output capacitor C having an equivalent series resistance Resr thereof to thereby obtain the output voltage Vout. When the load current ILoad stays high, the output voltage Vout will be at the lower level, as illustrated by FIG. 2, and when the load current ILoad steps back down, the output voltage Vout will spike up by $$\Delta V = I\text{Load} \times \text{Resr} \times Ai/Av \qquad [\text{EQ-1}]$$

Unfortunately, in a low-gain current PWM mode, the gain Av of the error amplifier 112 may be too small to reduce the ripple effect of the current sense signal VCS and error signal COMP, and there will be thus an offset occurred in the output voltage Vout of the voltage regulator 110. Namely, the low-gain current-mode voltage regulator is inherently disadvantageous because of the output offset. FIG. 4 shows the current sense signal VCS and error signal COMP in a PWM on-time period when the error amplifier 112 has a small gain Av, in which waveform 130 represents the error signal COMP and waveform 132 represents the current sense signal VCS. When the high-side transistor 124 is on, the current sense signal VCS raises up and the error signal COMP falls down. As the current sense signal VCS is crossing with the error signal COMP, the high-side transistor 124 will turn off and the output voltage Vout will decrease. Accordingly, the error signal COMP raises up and the current sense signal VCS falls down. The loop so operates cycle by cycle. Due to the ripple effect of the error signal COMP and current sense signal VCS, as shown in FIG. 4, the output voltage Vout will have an offset apart from the reference voltage Vref in the magnitude of $$\begin{aligned}
V\text{out, offset} &= V\text{offset}/Av \qquad [\text{EQ-2}]\\
&= (\Delta V1 + \Delta V2)/Av\\
&= \frac{1}{2}\frac{(\Delta IL \times Resr \times Av + \Delta IL \times Rs \times Ai)}{Av}\\
&= \frac{1}{2}\left[\frac{Vin - Vout}{L} \times \text{Ton} \times \left(Resr + Rs \times \frac{Ai}{Av}\right)\right]\\
&= \frac{1}{2}\left[\frac{Vin - Vout}{L} \times \frac{Vout}{Vin} \times T \times \right.\\
&\qquad \left.\left(Resr + Rs \times \frac{Ai}{Av}\right)\right]
\end{aligned}$$

where $\Delta V1$ is the amplitude of the error signal COMP, $\Delta V2$ is the amplitude of the current sense signal VCS, $\Delta IL$ is the ripple amplitude of the inductor current IL, Rs is the resistance of the current sense resistor Rs serially connected to the inductor IL, Ton is the on-time of the high-side transistor 124, and T is the switching period of the high-side transistor 124 and low-side transistor 126. Since the parameters L, T, Resr, Rs, Av and Ai are all constant, it may be obtained from the equation EQ-2 the relation $$Voffset \propto (Vin - Vout) \times \frac{Vout}{Vin} \qquad [EQ\text{-}3]$$

which shows the reason why the output voltage Vout will not be equal to the reference voltage Vref when the inductor current IL is zero.

Therefore, it is desired to cancel the low-gain system offset of a current-mode voltage regulator.

SUMMARY OF THE INVENTION

An object of the present invention is directed to precisely control the droop of a low-gain current-mode voltage regulator.

Specifically, an object of the present invention is directed to cancel the output offset of a low-gain current-mode voltage regulator.

Accordingly, an object of the present invention is directed to precisely control the output voltage of a low-gain current-mode voltage regulator.

In a low-gain current-mode voltage regulator, according to the present invention, an offset cancellation circuit is provided to add an offset to a PWM comparator to cancel the output offset of the voltage regulator. The offset cancellation circuit obtains the offset from the subtraction of the inputs of the PWM comparator.

In an embodiment, the offset cancellation circuit includes a combiner to obtain the subtraction of the current sense signal and error signal of the voltage regulator, which includes the offset source to produce an offset signal to inject into the error signal. Preferably, a low-pass filter is used to filter out the alternating current (AC) component of the output of the combiner so as to obtain the direct-current (DC) level of the subtraction for injecting into the error signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
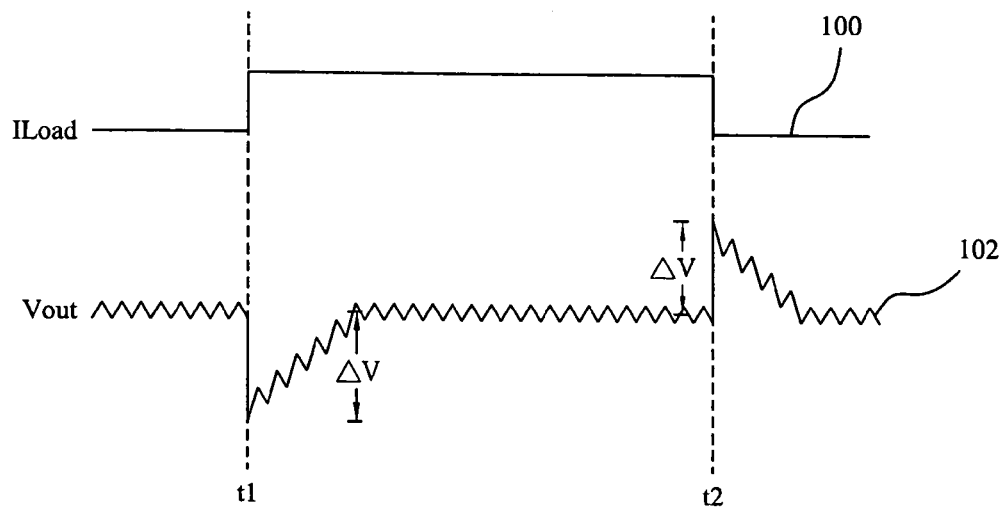
FIG. 1 is a waveform diagram to show the output signals of a conventional voltage regulator in a load transient.
Figure 2:
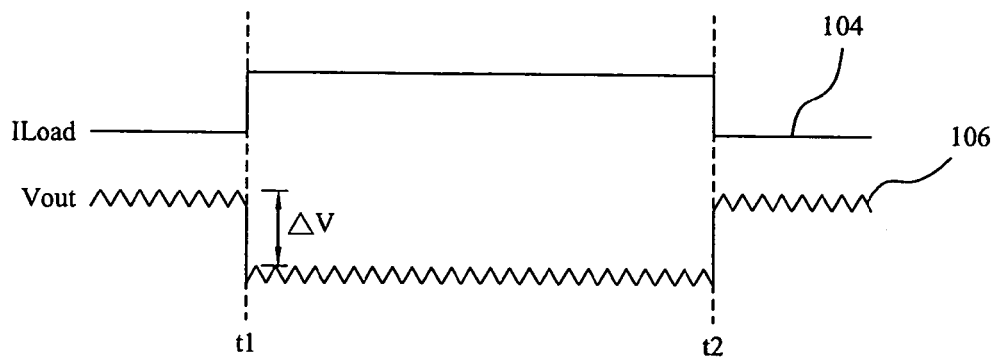
FIG. 2 is a waveform diagram to show the output signals of a conventional voltage regulator when an AVP control is applied thereof.
Figure 3:
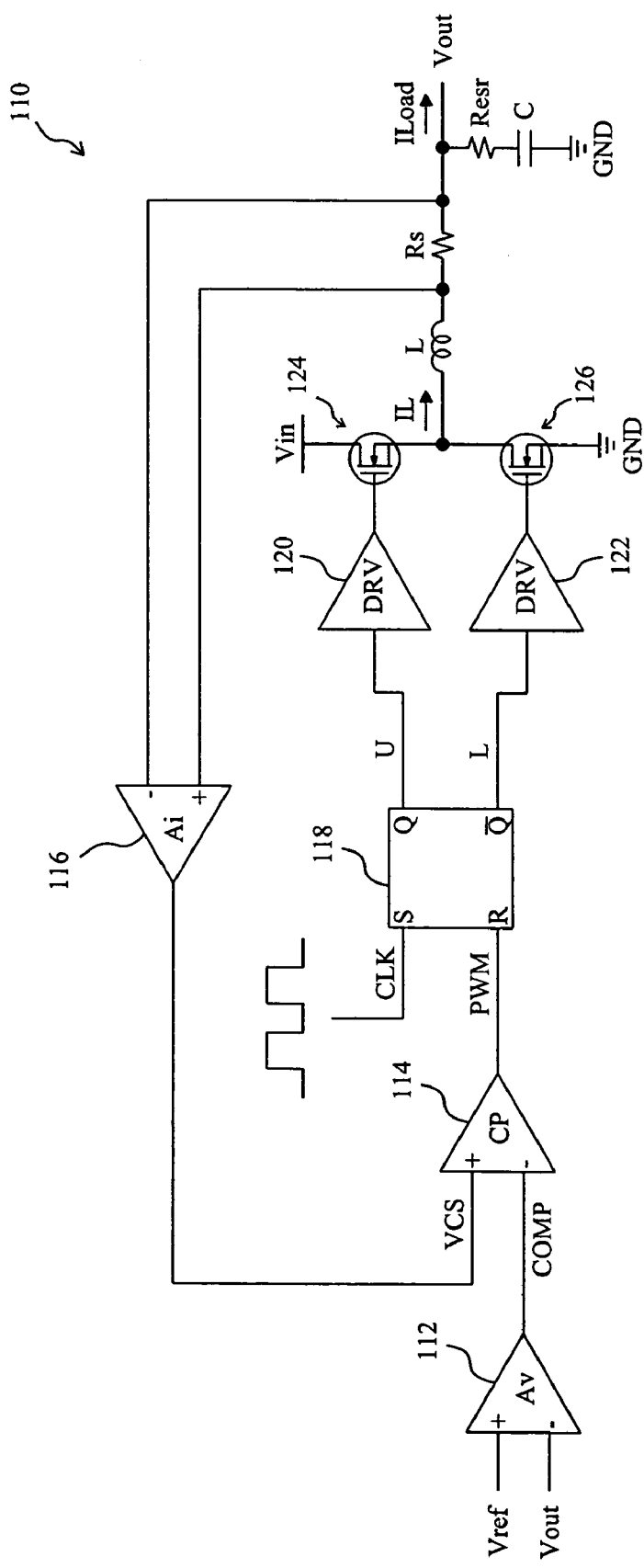
FIG. 3 shows a conventional current-mode voltage regulator.
Figure 4:
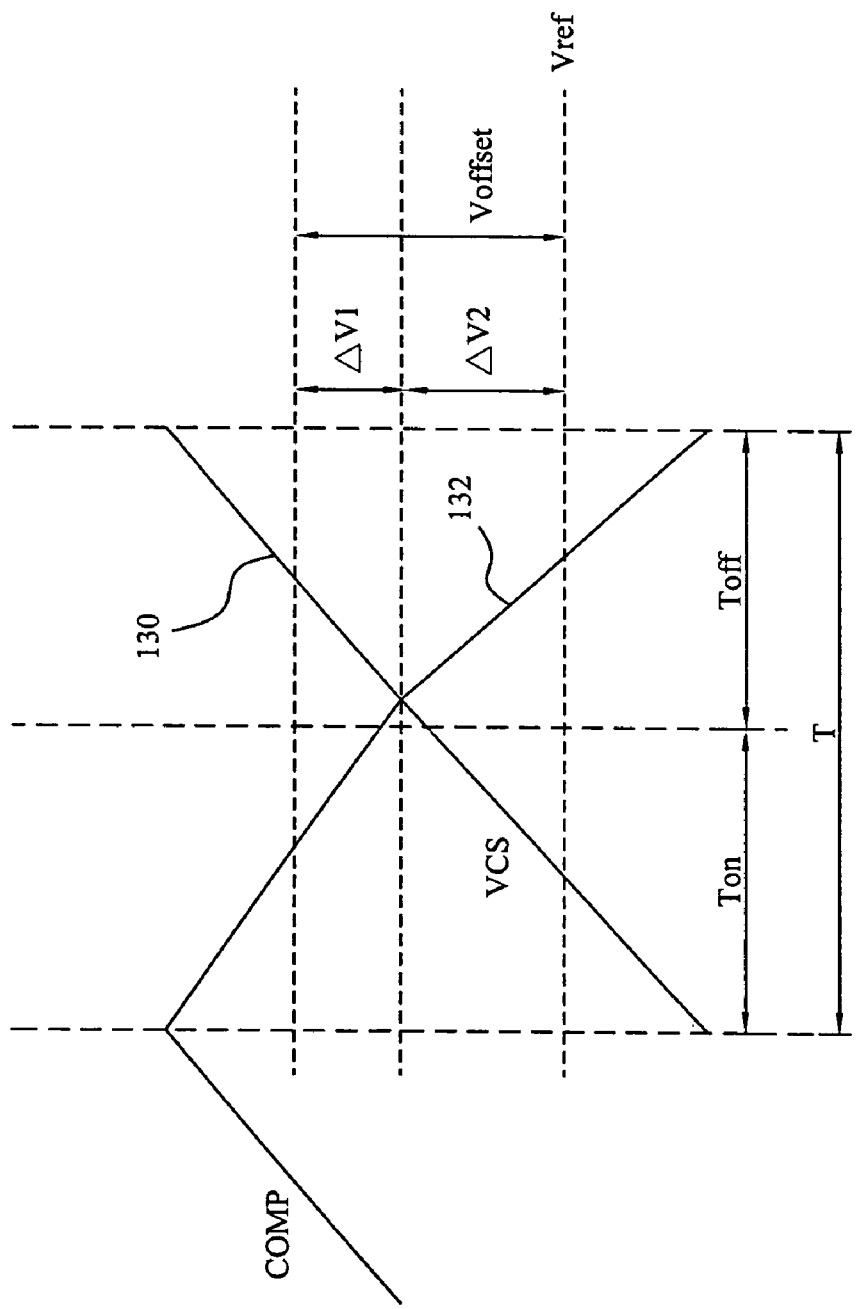
FIG. 4 shows the current sense signal VCS and error signal COMP of a current-mode voltage regulator in a PWM on-time period when the error amplifier of the voltage regulator has a small gain.
Figure 5:
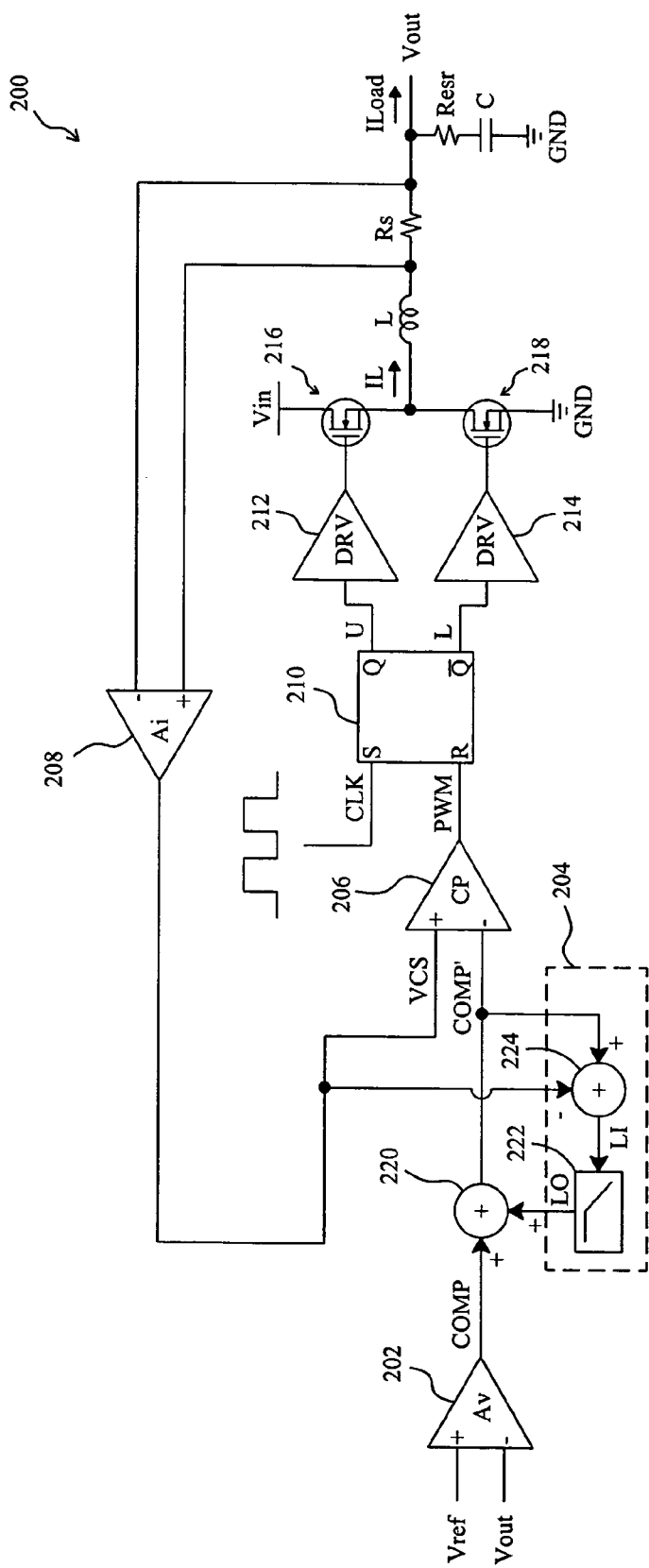
FIG. 5 shows a low-gain current-mode voltage regulator according to the present invention.
Figure 6:
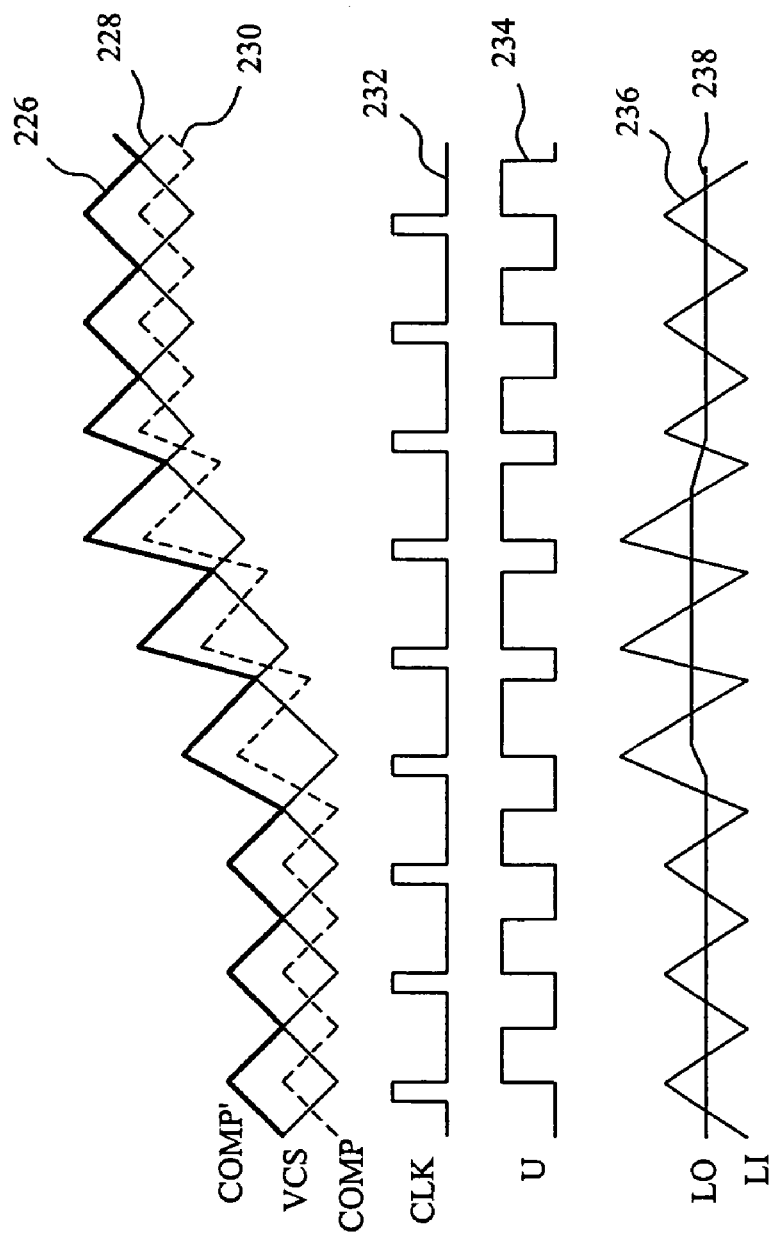
FIG. 6 is a waveform diagram to show various signals in the voltage regulator of FIG. 5.

FIG. 5 shows an embodiment of the present invention, and FIG. 6 is a waveform diagram to show various signals thereof. In a low-gain current-mode voltage regulator 200, a high-side switching signal U and a low-side switching signal L switch a high-side transistor 216 and a low-side transistor 218 serially connected between an input voltage Vin and ground GND with two drivers 212 and 214, respectively, to produce an inductor current IL to charge an output capacitor C to produce an output voltage Vout, an error amplifier 202 has a gain Av to amplify the difference between the output voltage Vout and a reference voltage Vref to produce an error signal COMP, a voltage amplifier 208 has a gain Ai to amplify the voltage drop across a current sense resistor Rs serially connected to the inductor L to produce a current sense signal VCS, a combiner 220 combines the error signal COMP and an offset signal LO provided by an offset cancellation circuit 204 to produce a modified error signal $$COMP'=COMP+LO \qquad [EQ\text{-}4]$$

a PWM comparator 206 produces a PWM signal by comparing the current sense signal VCS and modified error signal COMP', and an SR flip-flop 210 produces the switching signals U and L in response to the PWM signal and a clock CLK. By illustrating by FIG. 4 and the equation EQ-2, the offset Voffset of the output voltage Vout is equal to 1/Av times of the difference between the DC levels of the current sense signal VCS and error signal COMP. Therefore, the offset cancellation circuit 204 injects the offset signal LO into the error signal COMP to cancel the offset caused by the ripple effect of the current sense signal VCS and error signal COMP. The offset cancellation circuit 204 uses a combiner 224 to obtain the subtraction in the inputs of the PWM comparator 206, i.e., LI=COMP'−VCS. The subtraction signal LI indicates the offset source of the voltage regulator 200. However, the subtraction signal LI includes ripple item, and thus a low-pass filter 222 is used to filter out the ripple of the subtraction signal LI to obtain the DC level thereof, i.e., the offset signal LO. Namely, the low-pass filter 222 averages the subtraction of the modified error signal COMP' and current sense signal VCS to remove the AC signal component thereof.

In FIG. 6, waveform 226 represents the modified error signal COMP', waveform 228 represents the current sense signal VCS, waveform 230 represents the error signal COMP, waveform 232 represents the clock CLK, waveform 234 represents the high-side switching signal U, waveform 236 represents the subtraction signal LI, and waveform 238 represents the offset signal LO. As shown in FIG. 6, the offset signal LO is almost a DC signal, and by injecting it into the error signal COMP, the DC levels of the error signal COMP and current sense signal VCS are equal to each other. In response to the modified error signal COMP' and current sense signal VCS, only when the modified error signal COMP' is crossing with the current sense signal VCS, the PWM comparator 206 will send low level signal to the SR flip-flop 210 to turn off the high-side transistor 216. Offset still occurs in the inputs of the PWM comparator 206, but the injection of the offset signal LO into the error signal COMP cancels the output offset of the voltage regulator 200. That is, precise output voltage Vout is obtained.

From another point of view, if LPF is the transfer function of the low-pass filter 222, the error amplifier 202 and offset cancellation circuit 204 can be considered as a modified error amplifier having the gain $$Av' = Av + Av' \times LPF \quad [EQ-5]$$

The transfer function of the low-pass filter 222 is $$LPF = \frac{\omega p}{s + \omega p} \quad [EQ-6]$$

where ωp is the corner frequency of the low-pass filter 222, and s is the frequency of the subtraction signal LI. Substituting the equation EQ-6 into the equation EQ-5 will obtain the gain $$Av' = \frac{Av}{1 - LPF} = \frac{Av}{1 - \frac{\omega p}{s + \omega p}} \quad [EQ-8]$$

When the pole is the original point, i.e., s=0, it will obtain an infinite DC gain, and thus the low-gain current-mode voltage regulator 200 may be referred as a high gain system at DC level. As a result, it can be obtained the precise output voltage Vout.

In the voltage regulator 200, the offset signal LO is injected into the error signal COMP, while in other embodiments, it may be alternatively injected into the current sense signal VCS at opposite polarity, since in the PWM comparator 206 the inverting input and non-inverting input thereof will be compared with each other.

Figure 7:
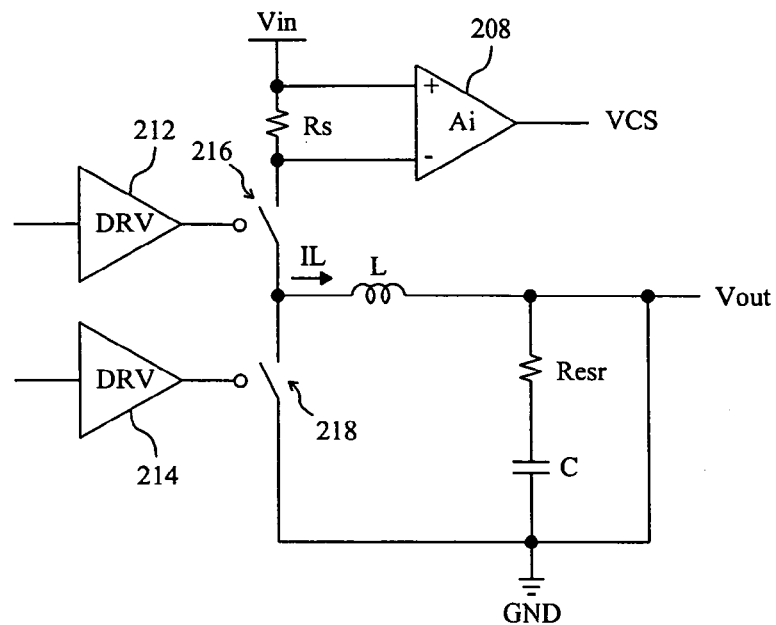
FIGS. 7-10 show four current sense circuits to sense the inductor current IL of a voltage regulator.
Figure 8:
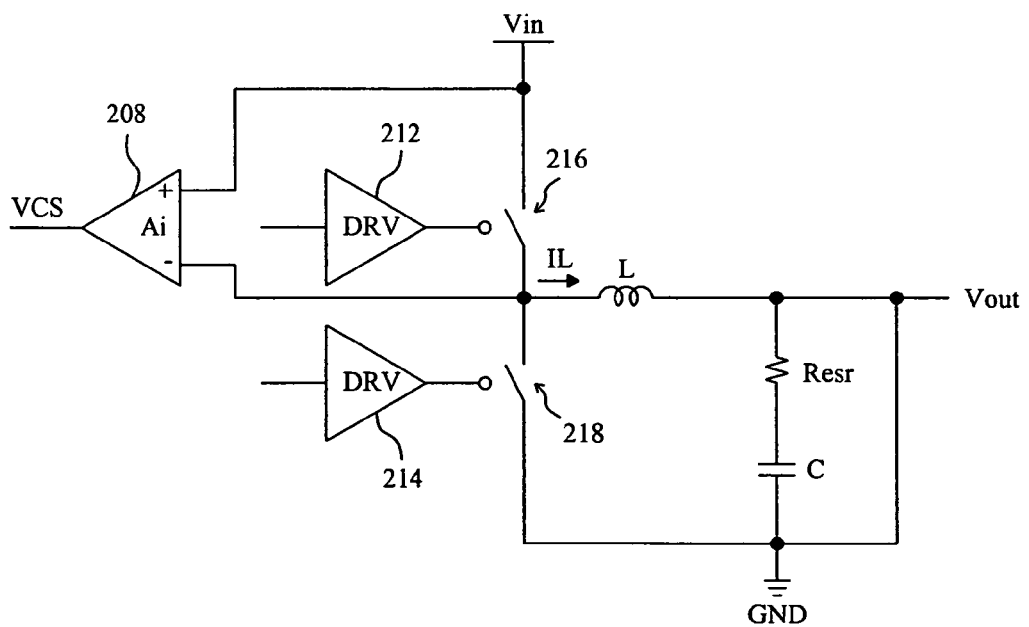
Figure 9:
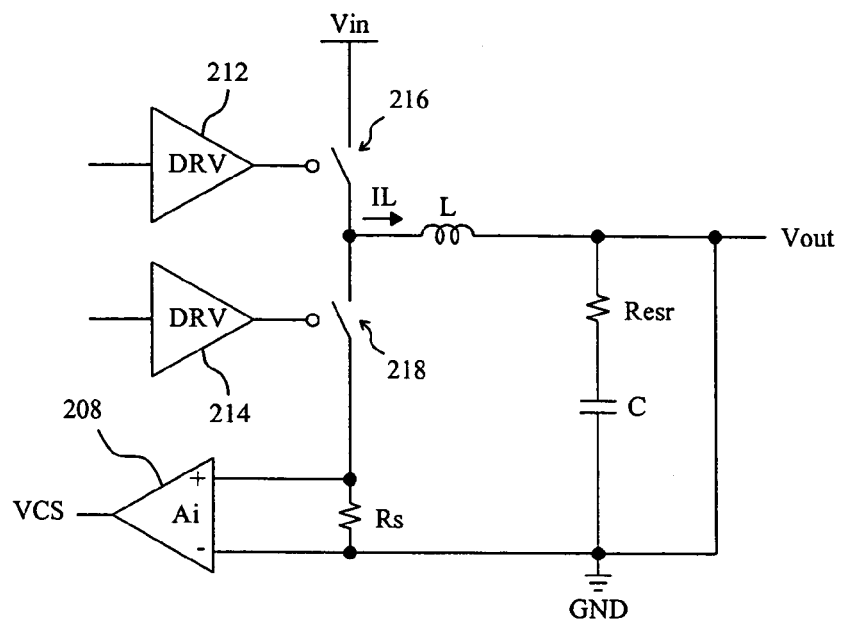
Figure 10:
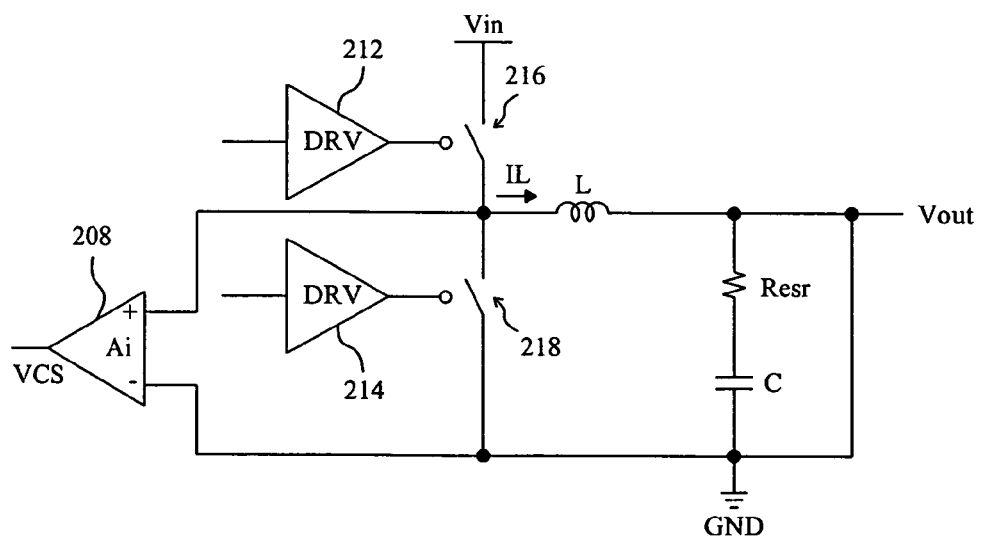

To sense the inductor current IL, the current sense resistor Rs may be the parasitic resistor in the inductor L, or an additional one inserted in the system. In the above embodiment, the current sense signal VCS is produced by the voltage amplifier 208 by sensing the voltage drop across the current sense resistor Rs serially connected to the inductor L, while in other embodiments, various alternative schemes can be used instead. FIGS. 7-10 show some typical current sense circuits, which sense either the ramp-up or ramp-down portion of the inductor current IL, and the combination properly selected therefrom or the combination of either one of them with any other not shown hereof may be used to sense the inductor current IL. In FIG. 7, the current sense resistor Rs is connected between the input voltage Vin and high-side switch 216 for the voltage amplifier 208 to sense the voltage drop thereacross to produce the current sense signal VCS. In FIG. 8, the voltage amplifier 208 directly senses the voltage drop across the high-side switch 216 to produce the current sense signal VCS. In FIG. 9, the current sense resistor Rs is connected between the low-side switch 218 and ground GND for the voltage amplifier 208 to sense the voltage drop thereacross to produce the current sense signal VCS. In FIG. 10, the voltage amplifier 208 directly senses the voltage drop across the low-side switch 218 to produce the current sense signal VCS.

Figure 11:
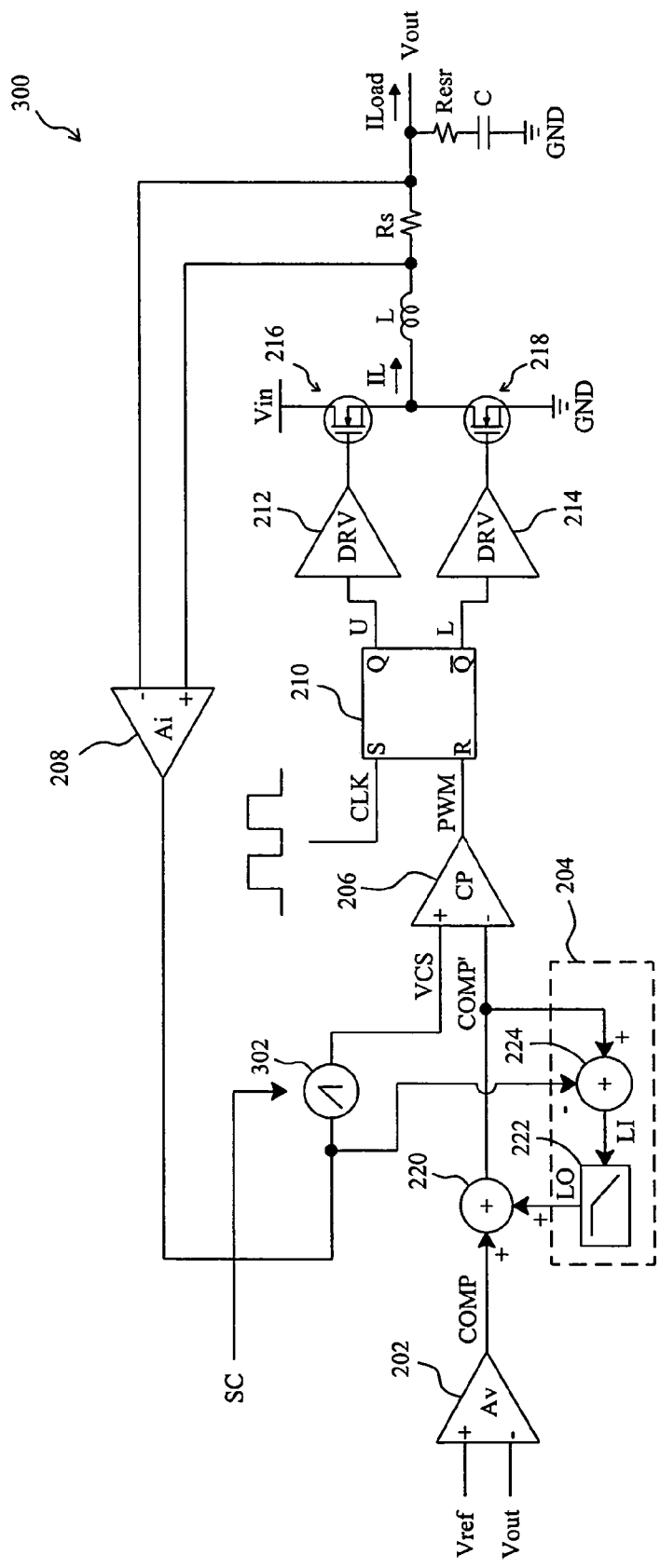
FIG. 11 shows a modification of the voltage regulator of FIG. 5.

To enhance the stability of the voltage regulator 200, it usually introduces a slope compensation mechanism as shown in FIG. 11, in which a slope compensation signal SC is provided to the non-inverting input of the PWM comparator 206 to combine with the current sense signal VCS. While in other embodiments, the slope compensation signal SC may be alternatively provided to the inverting input of the PWM comparator 206 to combine with the modified error signal COMP'.

As illustrated by the above embodiments, the present invention provides a simple, precise and global control to improve the offset issue in a low-gain current-mode voltage regulator.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A low-gain current-mode voltage regulator comprising:
   a PWM comparator in response to a first input and a second input for producing a PWM signal to regulate an output voltage of said voltage regulator;
   a low-gain error amplifier for producing a first signal varying with a difference between said output voltage and a reference voltage to provide for said first input;
   a current sense circuit for producing a second signal varying with an inductor current of said voltage regulator to provide for said second input; and
   an offset cancellation circuit for producing an offset signal from a subtraction between said first and second inputs to inject into said PWM comparator.

2. The voltage regulator of claim 1, wherein said offset signal is injected into either one of said first and second inputs.

3. The voltage regulator of claim 1, wherein said offset cancellation circuit comprises:
   a combiner for producing a third signal from said subtraction; and
   a low-pass filter for filtering said third signal to produce said offset signal.

4. The voltage regulator of claim 1, further comprising a slope compensation signal for injecting into said second input.

5. A control method for a low-gain current-mode voltage regulator, comprising the steps of:
   producing a PWM signal by a PWM comparator in response to a first input and a second input for regulating an output voltage of said voltage regulator;
   producing a first signal varying with a difference between said output voltage and a reference voltage for providing for said first input;
   producing a second signal varying with an inductor current of said voltage regulator for providing for said second input;
   producing an offset signal from a subtraction between said first and second inputs for injecting into said PWM comparator.

6. The control method of claim 5, wherein said offset signal is injected into either one of said first and second inputs.

7. The control method of claim 5, wherein said step of producing an offset signal comprises the steps of:
   producing a third signal from said subtraction; and
   filtering said third signal for producing said offset signal.

8. The control method of claim 5, further comprising the step of injecting a slope compensation signal into said second input.

* * * * *